(12) United States Patent
Thumm et al.

(10) Patent No.: US 10,951,102 B2
(45) Date of Patent: Mar. 16, 2021

(54) SQUIRREL-CAGE ROTOR AND METHOD OF MANUFACTURING THE SAME

(71) Applicant: Wieland-Werke AG, Ulm (DE)

(72) Inventors: Gerhard Thumm, Erbach (DE); Volker Voggeser, Senden (DE)

(73) Assignee: WIELAND-WERKE AG, Ulm (DE)

( * ) Notice: Subject to any disclaimer, the term of this patent is extended or adjusted under 35 U.S.C. 154(b) by 260 days.

(21) Appl. No.: 16/056,678

(22) Filed: Aug. 7, 2018

(65) Prior Publication Data

US 2018/0342935 A1    Nov. 29, 2018

Related U.S. Application Data

(62) Division of application No. 14/828,694, filed on Aug. 18, 2015, now abandoned.

(30) Foreign Application Priority Data

Sep. 17, 2014   (DE) .................... 10 2014 013 684.1

(51) Int. Cl.
| H02K 17/16 | (2006.01) |
| H02K 3/02 | (2006.01) |
| H02K 15/00 | (2006.01) |

(52) U.S. Cl.
CPC ............. *H02K 17/165* (2013.01); *H02K 3/02* (2013.01); *H02K 15/0012* (2013.01); *H02K 2213/03* (2013.01)

(58) Field of Classification Search
CPC ............. H02K 15/0012; H02K 17/165; H02K 2213/03; H02K 3/02
See application file for complete search history.

(56) References Cited

U.S. PATENT DOCUMENTS

| 1,371,233 A | 3/1921 | Fries |
| 1,694,061 A | 12/1928 | Hansen et al. |
| (Continued) | | |

FOREIGN PATENT DOCUMENTS

| DE | 3421 537 A1 | 12/1985 |
| DE | 195 42 962 C1 | 11/1996 |
| (Continued) | | |

OTHER PUBLICATIONS

German Office Action of corresponding application No. 10 2014 013 684.1, dated Aug. 4, 2015 (5 pgs).

(Continued)

*Primary Examiner* — Minh N Trinh
(74) *Attorney, Agent, or Firm* — Flynn Thiel, P.C.

(57) ABSTRACT

A squirrel-cage rotor having at least one laminated rotor core and a method of manufacturing the same are provided. Short-circuit rings in the squirrel-cage rotor are provided with at least two metal composite discs. A metal composite disc includes at least a first metal disc and a second metal disc connected to the first metal disc, where the second metal disc is made of a different material from the first metal disc. Adjacent metal composite discs are arranged such that the first metal discs face one another. The short-circuit rings are attached at an end face to the rotor core. Conductive rotor bars are attached to the first metal disc in the region of slots arranged in the outer periphery of the short-circuit rings.

9 Claims, 2 Drawing Sheets

(56) References Cited

U.S. PATENT DOCUMENTS

| | | | |
|---|---|---|---|
| 1,936,244 A | 11/1933 | Bergstrom | |
| 2,421,860 A | 6/1947 | Winther | |
| 2,499,390 A | 3/1950 | Joy | |
| 2,654,848 A | 10/1953 | Schaefer | |
| 3,694,906 A * | 10/1972 | Rank | H02K 1/28 29/598 |
| 5,467,521 A * | 11/1995 | Nakamura | H02K 15/0012 29/598 |
| 6,184,606 B1 | 2/2001 | Pyrhönen | |
| 6,998,752 B2 | 2/2006 | Yasuhara et al. | |
| 7,337,526 B2 * | 3/2008 | Sweo | B22C 9/04 164/112 |
| 8,193,680 B2 | 6/2012 | Fukuda et al. | |
| 8,276,255 B2 * | 10/2012 | Leachman | H02K 7/04 29/597 |
| 8,587,178 B2 | 11/2013 | Hong et al. | |
| 8,791,618 B2 | 7/2014 | Kajiya et al. | |
| 9,350,217 B2 | 5/2016 | Agapiou et al. | |
| 9,570,968 B1 | 2/2017 | Chen et al. | |
| 9,621,012 B2 | 4/2017 | Agapiou et al. | |
| 2007/0075603 A1 | 4/2007 | Whiddon | |
| 2010/0231064 A1 | 9/2010 | Leachman et al. | |
| 2011/0314659 A1 | 12/2011 | Leachman et al. | |
| 2012/0217839 A1 | 8/2012 | Kajiya et al. | |
| 2014/0285058 A1 | 9/2014 | Thumm et al. | |
| 2018/0342935 A1 * | 11/2018 | Thumm | H02K 17/165 |

FOREIGN PATENT DOCUMENTS

| | | |
|---|---|---|
| DE | 696 04 099 T2 | 1/2000 |
| DE | 697 34 839 T2 | 6/2006 |
| DE | 10 2010 009 317 A1 | 11/2010 |
| EP | 0 726 638 B1 | 9/1999 |
| EP | 2 782 222 A2 | 9/2014 |
| JP | 54-084633 A | 7/1979 |
| JP | 58-054845 A | 3/1983 |
| WO | WO 2012/011637 A1 | 1/2012 |

OTHER PUBLICATIONS

European Search Report for corresponding application No. 15 00 2495, dated Mar. 3, 2016 (9 pgs).

* cited by examiner

SQUIRREL-CAGE ROTOR AND METHOD OF MANUFACTURING THE SAME

CROSS-REFERENCE TO RELATED APPLICATIONS

This application is a divisional of prior U.S. application Ser. No. 14/828,694, filed Aug. 18, 2015, which is hereby incorporated by reference in its entirety.

FIELD OF THE INVENTION

The invention relates to a squirrel-cage rotor for an asynchronous machine, said squirrel-cage rotor having at least one laminated rotor core that comprises a plurality of grooves and said squirrel-cage rotor having at least one rotor cage comprising electrically conductive rotor bars that are embedded in the grooves of the laminated rotor core in such a manner that the rotor bars comprise at their two end regions an overlap beyond the laminated rotor core, and said rotor cage comprising short-circuit rings that are attached at the end face to the laminated rotor core and comprise a plurality of slots that are arranged in the region of their outer periphery and the end regions of the rotor bars protrude into said slots.

BACKGROUND OF THE INVENTION

The fundamental construction of squirrel-cage rotors for asynchronous machines is generally known from the prior art. Various methods are known for producing the rotor cage. In some cases, the entire rotor cage is cast in one piece. As a deviation from this, embodiments are known where the rotor bars are produced from a semi-finished product and are embedded in the grooves of the laminated rotor core. The short-circuit rings are subsequently cast on. In contrast to this, a further variant provides the short-circuit rings by producing them from correspondingly formed metal sheets. The metal sheets must have good electrically conductive characteristics and must be connected in a reliable manner to the rotor bars. This connection is formed in many cases by means of a soldering process, such as for example can be found in the document DE 34 21 537 A1.

Furthermore, squirrel-cage rotors are known from the document DE 195 42 962 C1, wherein the short-circuit rings are constructed from copper metal sheets and steel metal sheets that are positioned in an alternating manner with respect to one another. As a consequence, the mechanical stability of the short-circuit rings is to be improved and the in-laid steel metal plates are to limit the extent to which the short-circuit ring can expand even in the case of higher rotational speeds. The steel metal sheets are soldered to the copper metal sheets and the conductor bars.

It is proposed in the document DE 697 34 839 T2 to produce the short-circuit rings of a cage rotor from a bimetal metal sheet, in particular a steel-copper metal sheet. Bimetal short-circuit rings that are produced in this manner are then positioned with their steel face towards with the laminated rotor core, so that subsequently the short-circuit ring can be welded to the laminated rotor core.

OBJECT OF THE INVENTION

The object of the invention is to provide an improved squirrel-cage rotor for an asynchronous machine. The improvement relates to the construction of the short-circuit rings and their connection to the rotor bars.

The invention is characterized by the below discussed features, advantageous embodiments and further developments of the invention.

SUMMARY OF THE INVENTION

The invention includes a squirrel-cage rotor for an asynchronous machine, said squirrel-cage rotor having at least one laminated rotor core and having at least one rotor cage comprising electrically conductive rotor bars and short-circuit rings. The laminated rotor core comprises a plurality of grooves. The grooves can be embodied as grooves that are open in the radial direction towards the exterior. The rotor bars are embedded in the grooves of the laminated rotor core in such a manner that they comprise, at their two end regions, an overlap beyond the laminated rotor core. Short-circuit rings that comprise a plurality of slots that are arranged in the region of their outer periphery are provided on the end faces of the laminated rotor core and the end regions of the rotor bars protrude into said slots. The slots can be embodied as through-going openings that are open in the radial direction towards the exterior or are closed. In accordance with the invention, the short-circuit rings comprise in each case at least two metal composite discs that comprise at least one first metal disc and a second metal disc that is connected in a planar manner to said first metal disc and is made of a different material thereto. Adjacent metal composite discs are arranged, at least in part, in such a manner that first metal discs of these metal composite discs are facing one another. The rotor rods are bonded, preferably welded, to the first metal discs in the region of the slots.

The invention is based on the consideration that the short-circuit rings of the rotor cage comprise in each case a plurality of metal composite discs. The metal composite discs comprise at least two metal discs that are made of different materials and are connected one to the other in a planar and electrically conductive manner. The materials of the metal discs differ from one another with respect to their density, electrically conductive characteristics, strength characteristics and their costs. Consequently the metal composite discs offer, in contrast to mono-metal discs, more freedom with regard to optimizing the short-circuit rings with respect to the electrical conductance value, weight, strength and costs. The choice of the mutually combined materials and the thickness ratio of the individual metal discs plays an important role. The metal composite discs must be connected to the rotor bars at their end regions in an efficient electrically conductive manner. The connection must be reliable and must not fail during the entire serviceable life of the machine even under the influence of forces such as during the operation of rapidly rotating components. Therefore, the connection between the rotor bars and the metal composite discs is a bonded connection, for example, by way of a soldering process or preferably a welding process. Since it is difficult to bond different metal materials to each other, the technique used to connect the rotor bars and short-circuit rings is selected such that essentially only the metal disc of a metal composite disc whose material can be best connected to the material of the rotor bars is connected to the rotor bars. Within the scope of this invention, this metal disc is described as the 'first metal disc' whereas a metal disc that is made of a different material thereto is described as the 'second metal disc'. The current is transferred from the rotor bars to a metal composite disc by way of the bonded connections initially to the first metal disc. The planar bond between the metal discs renders it possible to transport the current within the metal composite disc with a minimum amount of electrical resistance. In accordance with the invention, the metal composite discs of the short-circuit rings are arranged at least in part in such a manner that the first metal discs of adjacent metal composite discs are facing one another. As a consequence, the first metal discs of adjacent metal composite discs, which are made of the same material, are positioned directly next to one another. This is achieved in the case of metal composite discs that comprise two metal discs by virtue of the fact that adjacent metal composite discs are arranged in a mirror-inverted manner with respect to one another with regard to their disc arrangement. Alternatively, solutions using multilayer metal composite discs are possible.

The particular advantage of this type of construction of short-circuit rings resides in the fact that two adjacent metal composite discs can be connected to a rotor bar by means of a single connection process, by way of example by means of a single welding procedure. Consequently, outlay and costs for connecting the short-circuit rings to the rotor bars can be almost halved. Furthermore, it is possible to produce a reliable connection between two adjacent metal composite discs without additional outlay. This improves the electrical conductivity of the short-circuit rings and increases the mechanical stability.

In a preferred embodiment of the invention, the rotor bars can be made at least in part from a material that can be easily welded to the material of the first metal discs. It is possible to produce particularly reliable connections by means of a welding process. Suitable connection methods are, for example, laser welding or electron beam welding. The two materials that are welded one to the other preferably have melt temperatures or melt ranges that are close to one another and have similar thermally conductive characteristics. The difference in melt temperatures or melt ranges is preferably a maximum 20 K.

In a particularly preferred embodiment of the invention, the rotor bars can be made, at least in part, from a material whose base material is identical to the base material of the first metal discs. The two materials that are to be welded to one another can therefore be different alloys of the same base material. In many cases, the two alloys can be easily welded as a result of the same base material. In particular, the conductivity and the strength of a material can be purposefully influenced by means of suitable alloying elements. Thus, it is possible, by way of example, to manufacture the rotor bars preferably from an alloy that has a particularly high strength, whereas an alloy that has particularly good conductivity characteristics is used for the first metal discs of the short-circuit rings.

In an advantageous embodiment of the invention, the metal discs, that are made from a different material and are part of the metal composite disc, are connected one to the other in a planar manner using a plating technique. The plating technique is a particularly suitable method of connecting different metal materials in a planar manner to one another, said materials being available in a strip or sheet metal form. A particularly suitable method for this purpose is the laser roll plating technique. The plating method renders it possible to produce semi-finished products that are made from metal composites, for example, bimetal strips. Semi-finished goods of this type can be metal composite discs that have been produced by means of a suitable separating method, for example, by stamping or laser cutting, and that are required in order to construct a short-circuit rotor in accordance with the invention.

In an advantageous embodiment of the invention, the first metal discs can comprise at least one bevel on their outer periphery. It is preferred that this bevel extends in the radial direction at least as far as the slots. A bevel of this type provides the first metal disc with a geometry that is favorable for connecting to the conductor bars. The bevel produces a type of circumferential groove through which the connection site between the first metal disc and the conductor bar is accessible. If a soldering process is used, the solder material can be introduced into the groove and thus directed to the connection site. If a welding process is used, energy can be introduced into the weld site by means of the groove, for example, using a flame or a laser beam or electron beam.

In an advantageous embodiment of the invention, the first metal discs, that is to say the metal discs that are bonded to the conductor bars, can be made from aluminum or an aluminum alloy. It is accordingly advantageous if the conductor bars are made, at least in part, from aluminum or an aluminum alloy. As a result of their density and relatively good electrically conductive characteristics, aluminum and aluminum alloys are preferred materials for the conductor bars and the short circuit rings of a cage rotor. To improve the electric conductance of the short-circuit rings in this advantageous embodiment, the second metal discs of the metal composite discs are preferably made from copper or a copper alloy. As a consequence, a favorable compromise between electric conductance and weight is achieved. In a particularly advantageous embodiment of the invention, the thickness $s_1$ of the first metal discs is at least 60% of the thickness s of the metal composite discs. The first metal discs are made from aluminum or an aluminum alloy. In comparison to other metal materials, aluminum is characterized by a very low density and a favorable price in relation to its volume. If at least 60% of the metal composite discs are made from aluminum or an aluminum alloy, then they are characterized by a low weight and low costs.

In an alternative advantageous embodiment of the invention, the first metal discs, that is to say the metal discs that are bonded to the conductor bars, are made of copper or a copper alloy. Accordingly, it is advantageous if the conductor bars are made of, at least in part, from copper or a copper alloy. Copper and copper alloys are preferred materials for conductor bars and short-circuit rings of a squirrel cage rotor due to their high electrical conductivity. To reduce the weight and the costs of the short-circuit rings in this advantageous embodiment of the invention, the second metal discs of the metal composite discs can preferably be made of aluminum or an aluminum alloy. As a consequence, a favorable compromise is achieved between electrical conductance, weight and cost.

BRIEF DESCRIPTION OF THE DRAWINGS

The invention is further explained with reference to the following exemplary embodiments and with reference to the schematic drawings, in which.

Mutually corresponding parts are provided with the same reference numeral in all figures.

DETAILED DESCRIPTION OF THE INVENTION

Figure 1:
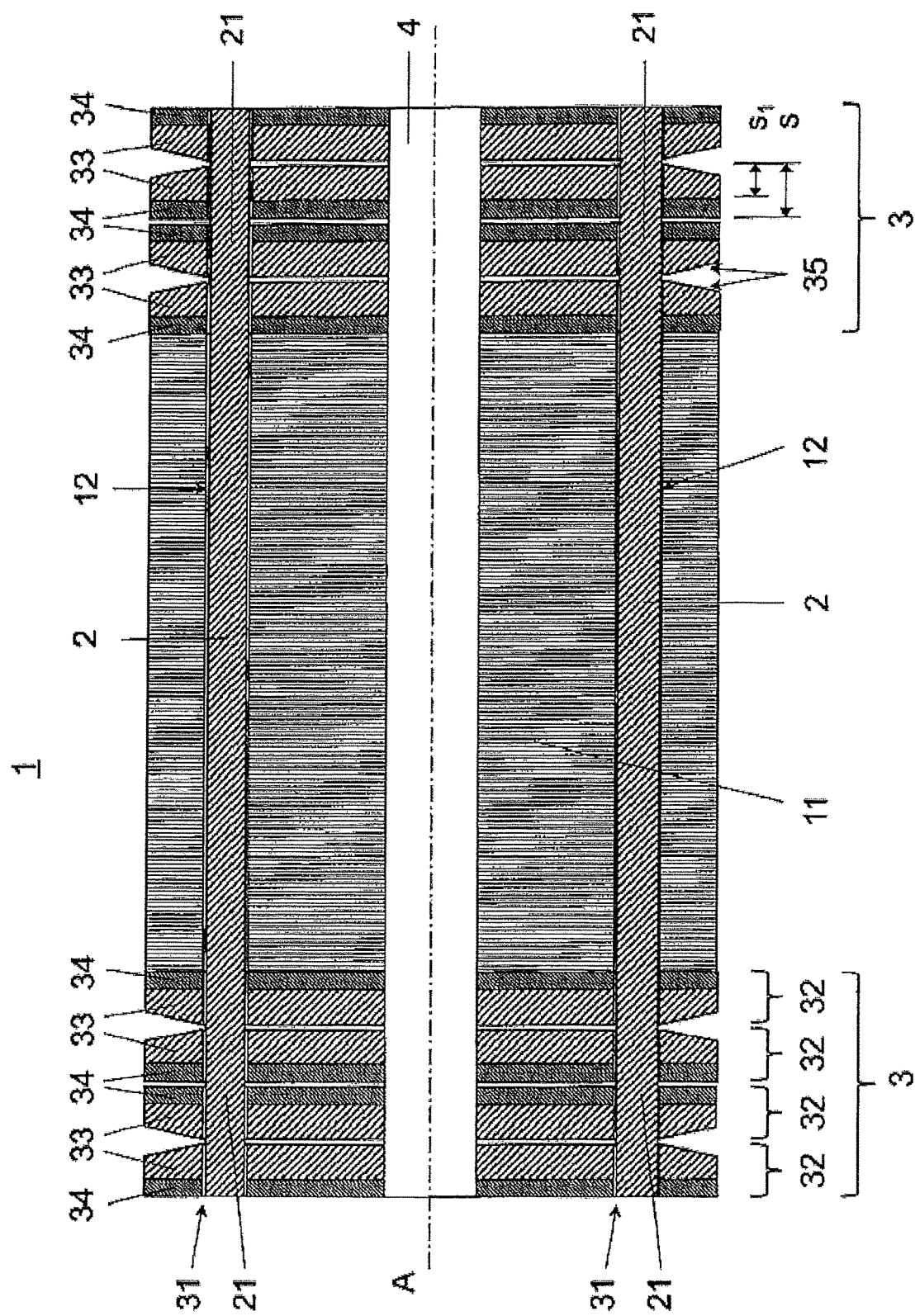
FIG. 1 illustrates a sectional view of a squirrel-cage rotor.

FIG. 1 illustrates a sectional view of a squirrel-cage rotor 1 in accordance with the invention. The squirrel-cage rotor 1 has an essentially cylindrical shape with an axis A and a centrally arranged bore hole 4 for receiving a shaft (not illustrated). The squirrel-cage rotor comprises a laminated rotor core 11 that is constructed in a manner known per se from individual metal sheets. The laminated rotor core 11 comprises a plurality of grooves 12, two of which are visible in the sectional view. Furthermore, the squirrel-cage rotor 1 comprises a plurality of electrically conductive rotor bars 2, two of which are visible in the sectional view, and also two short-circuit rings 3. The rotor bars 2 and the short-circuit rings 3 together essentially form the squirrel cage. The rotor bars 2 are embedded in the grooves 12 of the laminated rotor core 11 in such a manner that they comprise at their two end regions 21 an overlap beyond the laminated rotor core 11. Generally, the rotor bars 2 are not arranged in parallel to the axis A of the cage rotor 1 but rather are arranged inclined by a defined angle of twist with respect to the axis A. However, for reasons of clarity, this feature is not shown in the schematic illustration in FIG. 1. The rotor bars 2 are embodied in the illustrated exemplary embodiment as solid mono-metal bars. However, it is also possible to use bi-metal bars and/or hollow bars. The short-circuit rings 3 are attached to the end faces of the laminated rotor core 11. The short-circuit rings 3 comprise a plurality of slots 31 in the region of their outer periphery. The number and position of the slots 31 are to be selected such that said slots can be brought into alignment with the grooves 12 of the laminated rotor core 11. The end regions 21 of the rotor bars 2 protrude into the slots 31 of the short-circuit rings 3.

In accordance with the invention, the short-circuit rings 3 comprise four metal composite discs 32, which in turn each comprise a first metal disc 33 and a second metal disc 34 that is connected in a planar manner to said first metal disc and is made of a different material thereto. In each case, two adjacent metal composite discs 32 are arranged in such a manner that the first metal disc 33 or second metal disc 34 that are made of the same material are facing one another. If one accounts for each of the two short-circuit rings 3 the metal composite discs 32 commencing at the front face of the laminated rotor core, then the second and the fourth metal composite discs 32 are arranged in a mirror-inverted manner with respect to the first and third metal composite disc 32. As a consequence, between the first and the second and also between the third and the fourth metal composite disc 32, the first metal discs 33 that are made of the same material are facing one another. Likewise, between the second and the third metal composite disc 32, the second metal discs 34 that are made of the same material are facing one another. In the schematic illustration of FIG. 1, adjacent metal composite discs 32 are illustrated slightly spaced apart from one another for reasons of clarity. In reality, the metal composite discs 32 are generally positioned without a space with respect to one another. Furthermore, it is possible that a space is provided between the laminated rotor core 11 and the two metal composite discs 32 that are positioned directly adjacent to the laminated rotor core 11. The first metal discs 33 comprise a circumferential bevel 35 on their outer periphery that extends in the radial direction as far as the slots 31 of the short-circuit rings 3.

Figure 2:
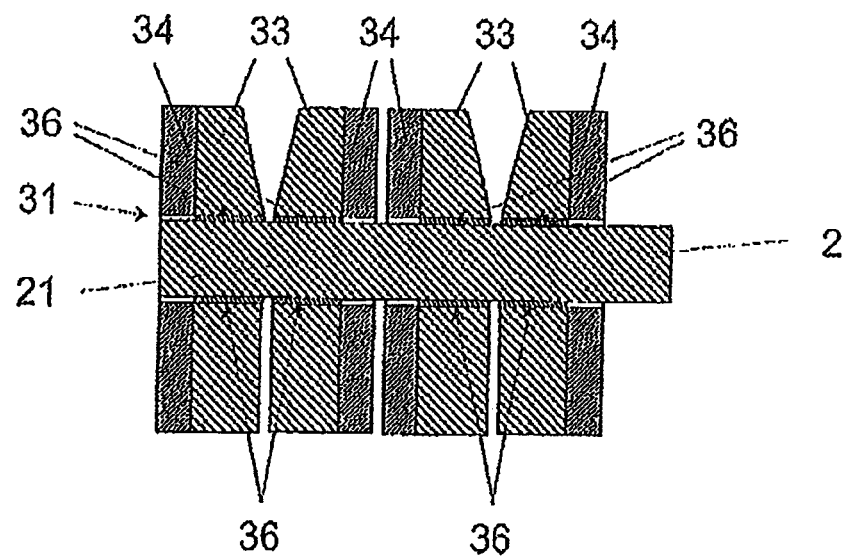
FIG. 2 illustrates an enlarged section of FIG. 1 in the region of the connection between the rotor bar and a short-circuit ring.
Figure 3:
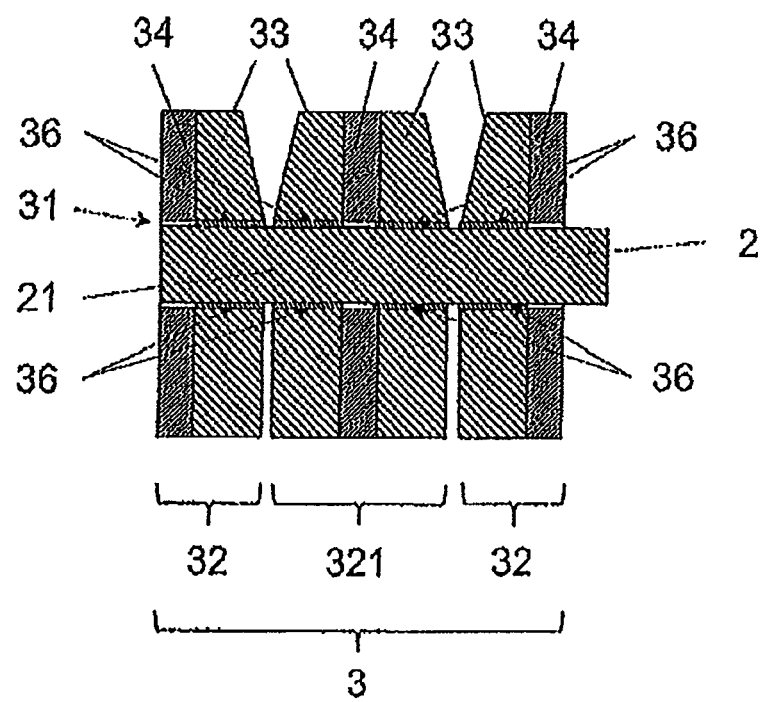
FIG. 3 illustrates an enlarged view of a further embodiment of a squirrel-cage rotor in accordance with the invention in the region of the connection between the rotor bar and a short-circuit ring.

By virtue of the identical hatchings of the elements that represent the rotor bars 2 and the first metal discs 33 in FIGS. 1, 2 and 3, it is to be made clear that the rotor bars 2 and the first metal discs 33 are preferably made of the same or similar materials. It is particularly preferred that the rotor bars 2 and the first metal discs 33 are made of aluminum or an aluminum alloy. As illustrated in FIG. 1, the thickness $s_1$ of the first metal discs 33 is at least 60% of the total thickness s of the metal composite disc 32. In an alternative embodiment, the rotor bars 2 and the first metal discs 33 can be made of copper or a copper alloy.

The rotor bars 21 are bonded, preferably welded, to the first metal discs 33 in the region of the slots 31. This is further explained in connection with FIG. 2.

FIG. 2 illustrates an enlarged section of FIG. 1 in the region of the connection between a rotor bar 2 and the first metal discs 33 of a short-circuit ring. A bonded connection 36 is produced in the region of the slots 31 between the first metal discs 33 and the end region 21 of the rotor bar 2, illustrated here in an abbrieviated manner. In the case of a solder connection, the connection 36 can be a solder material that fills a solder gap. In the case of a weld connection, the connection 36 can be formed by means of the parts of a molten material connected to one another or by means of a weld filler material. The two metal discs 34 and the rotor bar 2 are not bonded together, which is illustrated in FIG. 2 by means of a gap between these components.

FIG. 3 illustrates an enlarged section of a further embodiment of a squirrel-cage rotor in accordance with the invention 1 in the region of the connection between a rotor bar 2 and a short-circuit ring 3. In this embodiment, the short-circuit ring 3 comprises two metal composite discs 32 that are arranged in a mirror-inverted manner with respect to one another and comprise a first metal disc 33 and a second metal disc 34, and a metal composite disc 321 that is positioned between the metal composite discs. The metal composite disc 321 comprise two first metal discs 33 and a second metal disc 34 that is arranged between the two first metal discs. In each case, a bonded connection 36 is provided in the region of the slots 31 between the first metal discs 33 of the metal composite discs 32 and 321 and the end region 21 of the rotor bar 2, illustrated here in an abbrieviated manner. Although the outlay for producing metal composite discs 321 that comprise more than two metal discs 33, 34 is greater than when producing straightforward bi-metal discs, the outlay involved in assembling the short-circuit ring 3 is considerably reduced as a result of using this type of multi-layer metal composite discs 321. The embodiment in accordance with FIG. 3 can be modified to the extent that more than one metal composite disc 321 is used, the one metal composite disc comprising two first metal discs 33 and a second metal disc 34 that is arranged between the two first metal discs 33.

LIST OF REFERENCE NUMERALS

1 Squirrel-cage rotor
11 Laminated rotor core
12 Groove
2 Rotor bar
21 End region
3 Short-circuit ring
31 Slot
32 Metal composite disc
321 Metal composite disc
33 First metal disc
34 Second metal disc
35 Bevel
36 Connection
4 Bore hole
A Axis
s Thickness of a metal composite disc
$s_1$ Thickness of the first metal disc

What is claimed is:

1. A method of manufacturing a squirrel-cage rotor for an asynchronous machine, the squirrel-cage rotor having at least one laminated rotor core that comprises a plurality of grooves and an end face, electrically conductive rotor bars each having two end regions and that are embedded in the plurality of grooves of the laminated rotor core in such a manner that the rotor bars comprise at the two end regions an overlap beyond the laminated rotor core, and at least one short-circuit ring that comprises a plurality of slots that are arranged adjacent an outer periphery of the at least one short-circuit ring, said method comprising the steps of:
providing at least two metal composite discs each comprising a first metal disc of a first material and a second metal disc of a second material, the second metal disc being made of a different material from that of the first metal disc, and the first material of the first metal disc being connected to the second material of the second metal disc in a planar fashion through a preceding plating process;
forming the at least one short-circuit ring by arranging at least two of said at least two metal composite discs directly adjacently and in such a manner that the first metal discs are adjacent and face one another directly;
attaching the at least one short-circuit ring at the end face of the laminated rotor core, one of said two end regions of each rotor bar protruding into at least one of said slots; and
bonding the rotor bars to the first metal discs in the region of the slots, wherein said first metal discs of two directly adjacent metal composite discs are conjointly bonded to at least one of said rotor bars.

2. The method according to claim 1, wherein the rotor bars comprise a material that can be easily welded to the material of the first metal disc.

3. The method according to claim 2, wherein the rotor bars comprise a material whose base material is identical to the base material of the first metal disc.

4. The method according to claim 1, wherein an outer periphery of the first metal disc comprises at least one bevel.

5. The method according to claim 1, wherein the first metal disc is made of aluminum or an aluminum alloy.

6. The method according to claim 5, wherein a thickness of the first metal disc is at least 60% of a thickness of the at least two metal composite discs.

7. The method according to claim 1, wherein the first metal disc is made of copper or a copper alloy.

8. A method of manufacturing a squirrel-cage rotor comprising the steps of:
providing a laminated rotor having a plurality of slots and two ends;
providing a plurality of conductive rotor bars each having two opposed end regions;
embedding the plurality of conductive rotor bars into the slots of the laminated rotor such that the two end regions of each rotor bar extend beyond the ends of the laminated rotor;
providing a first composite disc and a second composite disc, each composite disc comprising a first metal disc and a second metal disc, the first metal disc and the second metal disc of different materials and being attached to each other in a planar fashion;
assembling a short-circuit ring by placing the first composite disc and second composite disc adjacent each other with the first metal disc of the first composite disc adjacent to and facing the first metal disc of the second composite disc; and
placing the short-circuit ring on one of the end regions of the conductive rotor bars and adjacent an end of the laminated rotor.

9. The method of manufacturing a squirrel-cage rotor of claim 8, and further comprising the step of bonding the conductive rotor bars to the first metal discs such that the first composite disc and the second composite disc are conjointly bonded to at least one conductive rotor bar.

* * * * *